(12) United States Patent
Iskander et al.

(10) Patent No.: US 10,652,910 B2
(45) Date of Patent: May 12, 2020

(54) LONG-TERM EVOLUTION (LTE) AND WIRELESS LOCAL AREA NETWORK (WLAN) AGGREGATION (LWA) CONNECTION PROCEDURES

(71) Applicant: Intel IP Corporation, Santa Clara, CA (US)

(72) Inventors: Shadi Iskander, Unterhaching (DE); Alexander Sirotkin, Petach Tikva (IL); Jerome Parron, Fuerth (DE); Karim Morsy, Nuremberg (DE); Nageen Himayat, Fremont, CA (US)

(73) Assignee: INTEL IP CORPORATION, Santa Clara, CA (US)

( * ) Notice: Subject to any disclaimer, the term of this patent is extended or adjusted under 35 U.S.C. 154(b) by 2 days.

(21) Appl. No.: 15/768,498

(22) PCT Filed: Mar. 30, 2016

(86) PCT No.: PCT/US2016/025063
§ 371 (c)(1),
(2) Date: Apr. 13, 2018

(87) PCT Pub. No.: WO2017/078781
PCT Pub. Date: May 11, 2017

(65) Prior Publication Data
US 2018/0324826 A1 Nov. 8, 2018

Related U.S. Application Data

(60) Provisional application No. 62/251,592, filed on Nov. 5, 2015.

(51) Int. Cl.
*H04W 72/12* (2009.01)
*H04W 88/06* (2009.01)
(Continued)

(52) U.S. Cl.
CPC ....... *H04W 72/1215* (2013.01); *H04W 76/19* (2018.02); *H04W 76/27* (2018.02);
(Continued)

(58) Field of Classification Search
CPC . H04W 72/1215; H04W 76/30; H04W 76/27; H04W 76/19; H04W 88/10; H04W 88/06
See application file for complete search history.

(56) References Cited

U.S. PATENT DOCUMENTS

2015/0049707 A1* 2/2015 Vajapeyam ........... H04W 24/10
370/329
2016/0234752 A1* 8/2016 Hsu ..................... H04L 12/4641
(Continued)

OTHER PUBLICATIONS

3GPP TS 36.323; "3rd Generation Partnership Project; Technical Specification Group Radio Access Network; Evolved Universal Terrestrial Radio Access (E-UTRA); Packet Data Convergence Protocol (PDCP) Specification"; (Jun. 2015); 33 pages; V12.4.0, (Release 12).

(Continued)

*Primary Examiner* — Walli Z Butt
(74) *Attorney, Agent, or Firm* — Thorpe North & Western LLP

(57) ABSTRACT

Technology for a user equipment (UE) to perform long-term evolution (LTE) and Wireless local area network (WLAN) aggregation (LWA) connection procedures within a wireless communication network is disclosed. The UE can determine to suspend communication on a wireless local area network (WLAN) of one or more protocol data units (PDUs) for a LWA session without terminating the LWA session. The UE can process, for transmission to an eNodeB, a request to suspend communication of the one or more PDUs on the WLAN to enable the eNodeB to schedule the one or more PDUs for transmission to the UE through a cellular interface without terminating the LWA session.

22 Claims, 10 Drawing Sheets

(51) Int. Cl.
    H04W 88/10    (2009.01)
    H04W 76/19    (2018.01)
    H04W 76/30    (2018.01)
    H04W 76/27    (2018.01)
(52) U.S. Cl.
    CPC .......... *H04W 76/30* (2018.02); *H04W 88/06* (2013.01); *H04W 88/10* (2013.01)

(56) References Cited

U.S. PATENT DOCUMENTS

2016/0366720 A1* 12/2016 Wu .................. H04W 28/0236
2017/0156049 A1*  6/2017 Bergstrom ............ H04W 48/10

OTHER PUBLICATIONS

CATT; "Discussion on WLAN Connection Failure Detection in LWA"; 3GPP TSG R2-154037; (Oct. 5-9, 2015); 3 pages; RAN WG2 Meeting #91bis; Agenda 7.6.2.1.
Intel Corporation; "Control Signalling Flows for LWA"; 3GPP TSG R2-154666; (Oct. 4-10, 2015); 3 pages; RAN2 Meeting #91-bis, Malmo, Sweden; Agenda 7.6.2.1.
Samsung; "(Temporary) Loss of WLAN Coverage in LWA"; 3GPP TSG R2-154088; (Oct. 5-9, 2015); 10 pages; RAN WG2 Meeting #91bis, Malmo, Sweden; Agenda 7.6.2.1.
International Preliminary Report on Patentability dated May 8, 2018, in International Application No. PCT/US2016/025063, filed Mar. 30, 2016; 8 pages.

* cited by examiner

400

-- ASN1START

WLANConnectionStatusReport-r13 ::= SEQUENCE {
    criticalExtensions             CHOICE {
        c1                              CHOICE {
            wlanConnectionStatusReport-r13    WLANConnectionStatusReport-r13-IEs,
            spare3 NULL, spare2 NULL, spare1 NULL
        },
    criticalExtensionsFuture      SEQUENCE {}
    }
}

WLANConnectionStatusReport-r13-IEs ::= SEQUENCE {
    wlanConnectionStatus        WLANConnectionStatus-r13,
    wlanLinkLossCause           WLANLinkLossCause-r13    OPTIONAL, -- Cond Link-Loss
    nonCriticalExtension        SEQUENCE {}      OPTIONAL
}

WLANConnectionStatus-r13 ::= ENUMERATED {associated, link-lost, suspended, resumed}

WLANLinkLossCause-r13 ::= ENUMERATED {outOfWLAN-Coverage, wlanTurnedOff, wlanUserPreferencesEnabled}

-- ASN1STOP

| *WLANConnectionStatusReport* field descriptions ||
|---|---|
| *wlanConnectionStatus* - | Indicates the status of the WLAN connection between the UE and the WLAN mobility set configured by the eNB |
| *wlanLinkLossCause* - | Indicates the cause of the link loss. |
| Conditional presence | Explanation |
| Link-Loss | The field is mandatory present if wlanConnectionStatus is set to *link-lost*. Otherwise the link-loss is conditional |

FIG. 4

LONG-TERM EVOLUTION (LTE) AND WIRELESS LOCAL AREA NETWORK (WLAN) AGGREGATION (LWA) CONNECTION PROCEDURES

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi. In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In addition, a wireless multiple-access communications system may include a number of eNodeBs, each simultaneously supporting communication for multiple mobile devices. The eNodeBs may communicate with mobile devices on downstream and upstream links. In some wireless networks, a user equipment (UE) may be capable of supporting multiple wireless technologies concurrently. For example, a UE may simultaneously transmit data over a wireless local area network (WLAN) link and a Long Term Evolution (LTE) link. However, current scalability, deployment, functionality, and protocols for communication between the UE and the eNodeB and/or the WLAN can be inefficient to meet the current demands. Thus, a desire exits for a solution to provide functionality and protocols scalable and efficient to meet the constraints for communication between the UE and the eNodeB and/or the WLAN.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 4 illustrates long-term evolution (LTE) and wireless local area network (WLAN) aggregation (LWA) using a wireless local area network (WLAN) connection status report message for suspending or resuming the communication of the one or more packet data units (PDUs) on the WLAN for the LWA session in accordance with an example;

Figure 1:
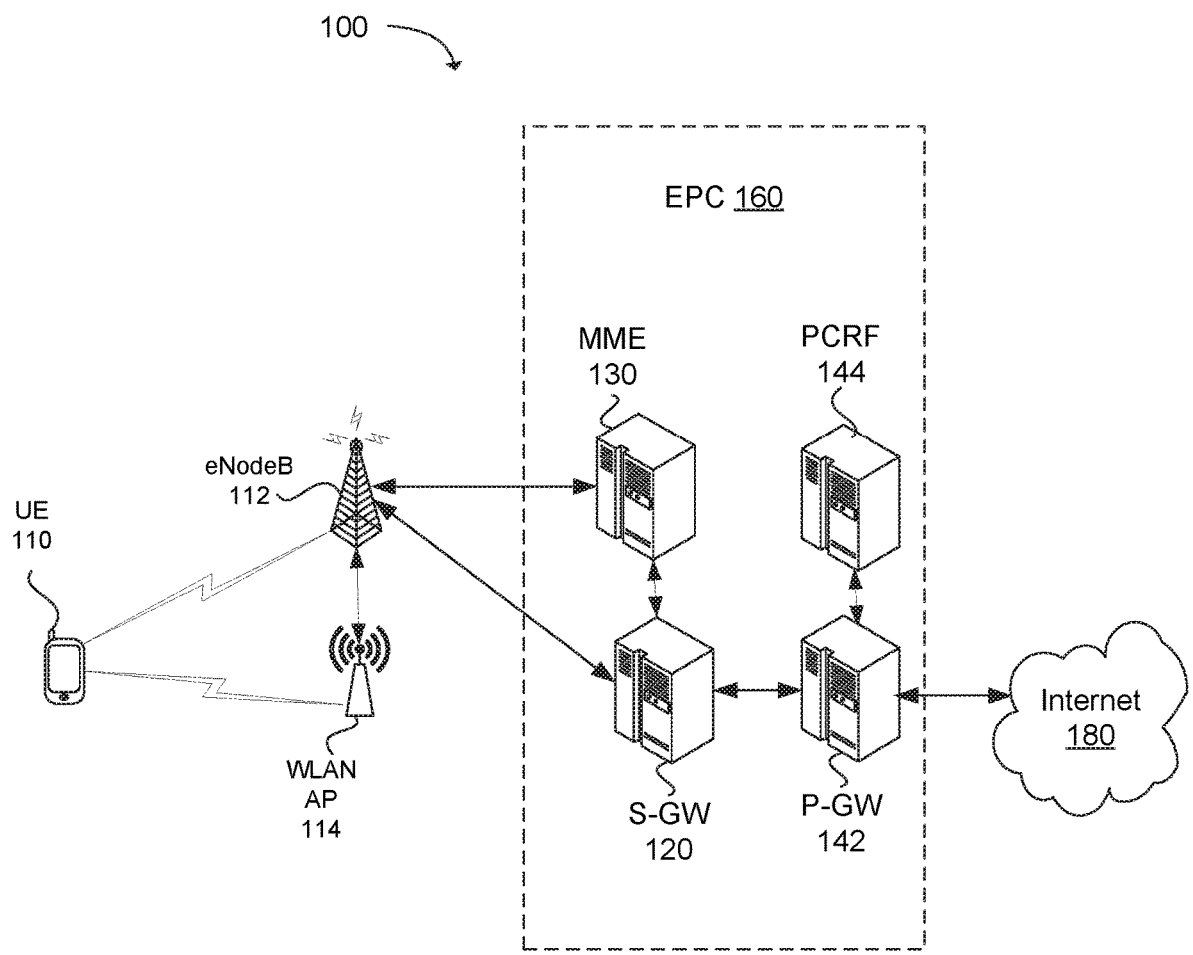
FIG. 1 depicts an illustrative wireless communications system in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one aspect, the present technology provides for third generation partnership project (3GPP) long-term evolution (LTE) and wireless local area network (WLAN) aggregation (LWA). In one aspect, LWA can be an alternative to LTE and WLAN interworking by providing data aggregation at a radio access network (RAN), where an Evolved NodeB (eNB) can schedule packets (e.g., packet data units "PDUs") to be served on LTE and WiFi radio links. An advantage of LWA is that LWA can provide increased control and utilization of resources on both links (e.g., LTE links and WiFi radio links). LWA can increase the aggregate throughput for all users and improve the total system capacity by better managing the radio resources among users.

A UE may be sporadically constrained to engage in micro transactions with home wireless local area network (WLAN) networks. If LWA is active, an LWA connection may be torn down for the UE to perform the micro transactions, unless the UE supports concurrent operation with multiple WLAN networks. After the LWA tear down operations, the LWA can be restored again after the connection to the WLAN is no longer necessary. Even though the UE can indicate to the network that the WLAN is no longer available, the network can respond by performing a WLAN termination (WT) release procedure for terminating the LWA. However, since micro transactions are short in nature, entirely terminating the LWA can be inefficient, particularly because the UE may have to indicate to the network that the WLAN is available and the network is constrained to re-initiate LWA by a WT addition procedure as soon as the micro transactions are completed.

Furthermore, when the UE is performing a WLAN access point (AP) change within a configured WLAN mobility set, the UE is not constrained to inform the eNB of this change. This can result in data loss while the UE is associating with the new WLAN AP, such as, for example, when the UE is moving between different APs, which are not connected to the same access controller (AC), but controlled by the same WT.

Currently, the UE can only inform the eNB about the loss of connection via a WLAN Connection Status Reporting procedure. The WLAN Connection Status Reporting procedure can trigger an LWA tear down or reestablishment, such as the WT release or the WT addition procedures. However, the WLAN Connection Status Reporting procedure can experience one or more challenges to perform while inefficiently consuming resources (e.g., measurements/reporting/WT Addition), especially if the WLAN Connection Status Reporting procedure frequently occurs during one LWA session. The WLAN Connection Status Reporting procedure can cause performance degradation and can confuse the eNB and affect further LWA activation decisions. For example, the eNB may not re-activate LWA when the UE indicates that WLAN is available again. If measurements are configured, then UE can use a measurement report to indicate that WLAN is available again. However, if there are no configured measurements, the UE in unable to indicate the availability of the WLAN.

Accordingly, the present technology provides a user equipment (UE) operable determine to suspend communication on a wireless local area network (WLAN) of one or more protocol data units (PDUs) for a LWA session without terminating the LWA session. The UE can process, for transmission to an eNodeB, a request to suspend communication of the one or more PDUs on the WLAN to enable the eNodeB to schedule the one or more PDUs for transmission to the UE through a cellular interface (e.g., third generation partnership project (3GPP) air interface) without terminating the LWA session. This can significantly reduce the overhead used to tear down and re-establish an LWA session when micro transactions are performed with the home WLAN network.

In one aspect, the present technology provides an eNodeB configured to perform long-term evolution (LTE) and Wireless local area network (WLAN) aggregation (LWA) connection procedures with a user equipment (UE). The eNodeB can identify one or more protocol data units (PDUs) to be scheduled for communication over a cellular interface (e.g., third generation partnership project (3GPP) air interface) and one or more PDUs communicated over a wireless local area network (WLAN) in an LWA session. The eNodeB can process a request, received from the UE, to suspend communication of the one or more PDUs on the WLAN for the LWA session without terminating the LWA session. The eNodeB can schedule all PDUs for the LWA session for communication through the third generation partnership project (3GPP) air interface without terminating the LWA session.

In one aspect, the present technology provides an eNodeB configured to perform long-term evolution (LTE) and Wireless local area network (WLAN) aggregation (LWA) connection procedures with a user equipment (UE). The eNodeB can determine to suspend communication on a wireless local area network (WLAN) of one or more protocol data units (PDUs) for a LWA session without terminating the LWA session. The eNodeB can process a request, received from the UE, to suspend communication of the one or more PDUs on the WLAN for the LWA session without terminating the LWA session. The eNodeB can suspend communication of the one or more PDUs on the WLAN for the LWA session. The eNodeB can schedule all PDUs for the LWA session for communication through a third generation partnership project (3GPP) air interface without terminating the LWA session. The eNodeB can resume communication of the one or more PDUs on the WLAN for the LWA session upon receiving a resume communication request from the UE or upon expiration of a selected period of time.

FIG. 1 illustrates an example of one type of wireless network 100 operable to communicate based on a 3GPP LTE standard. In this example, a node can be illustrated and be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE) 110. As depicted in FIG. 1, the node is illustrated, by way of example only, as an eNodeB 112. Downlink (DL) transmission can be a communication from the eNodeB 112 (e.g., the node) to the wireless device (e.g., UE 110), and the uplink (UL) transmission can be a communication from the wireless device (e.g., UE 110) to the eNodeB 112 (e.g., the node).

The eNodeB 112 can include one or more antennas, one or more radio modules to modulate and/or demodulate signals transmitted or received on an air interface, and one or more digital modules to process signals transmitted and received on the air interface. The eNodeBs can be a relatively high power node, referred to as a "macro node" or a relatively low power node (LPN). An LPN can include a micro node, pico node, home eNB (HeNB), remote radio head (RRM), remote radio entity (RRE), and the like.

The eNodeB 112 can provide communication coverage for a particular geographic area. The term "cell" can refer to a coverage area of an eNB 112 and/or an eNB subsystem serving this coverage area. The UE can also be in communication with a wireless local area network (WLAN) access point 114. The eNodeB 112 and the WLAN can be included within a radio access network and in communication with an evolved packet core (EPC) 160.

The EPC 160 can include a serving gateway (S-GW) 120 and a mobility management entity (MME) 130. The EPC 160 can also include a packet data network (PDN) gateway (P-GW) 142 to couple a serving gateway (S-GW) 120 to the PDN, such as the Internet 180, an intra-net, or other similar network. The S-GW can provide Internet network access and standard network access for the mobile devices associated with the RAN. The S-GW 120 and MME 130 can be in direct communication with each other via cabling, wire, optical fiber, and/or transmission hardware, such a router or repeater. The eNodeB 112 can be connected to one or more user equipments (UE) 110, and the WLAN AP 114, respectively. The eNodeB 112 can be in direct communication with the EPC 160 and each of the components within the EPC 160.

The EPC 160 can also include a policy and charging rules function (PCRF) node 144 that can be used to determine, in near real time, policy rules in the wireless network. The PCRF node can access subscriber databases and other specialized functions, such as charging systems, as can be appreciated.

In one aspect, the UE 110 can communicate with a wireless local area network (WLAN) access point (AP) 114. The eNodeB 112 can also be in communication with the WLAN AP 114. In one aspect, the eNodeB 112 and a WLAN AP 114 can provide the UE 110 with access to the evolved packet core 160 using different radio access technologies (RATs). For example, the eNodeB 112 can provide access to the evolved packet core 160 over LTE access technology, such as a 3GPP LTE air interface, and the WLAN AP 114 can provide access to the eNodeB 112.

Figure 2:
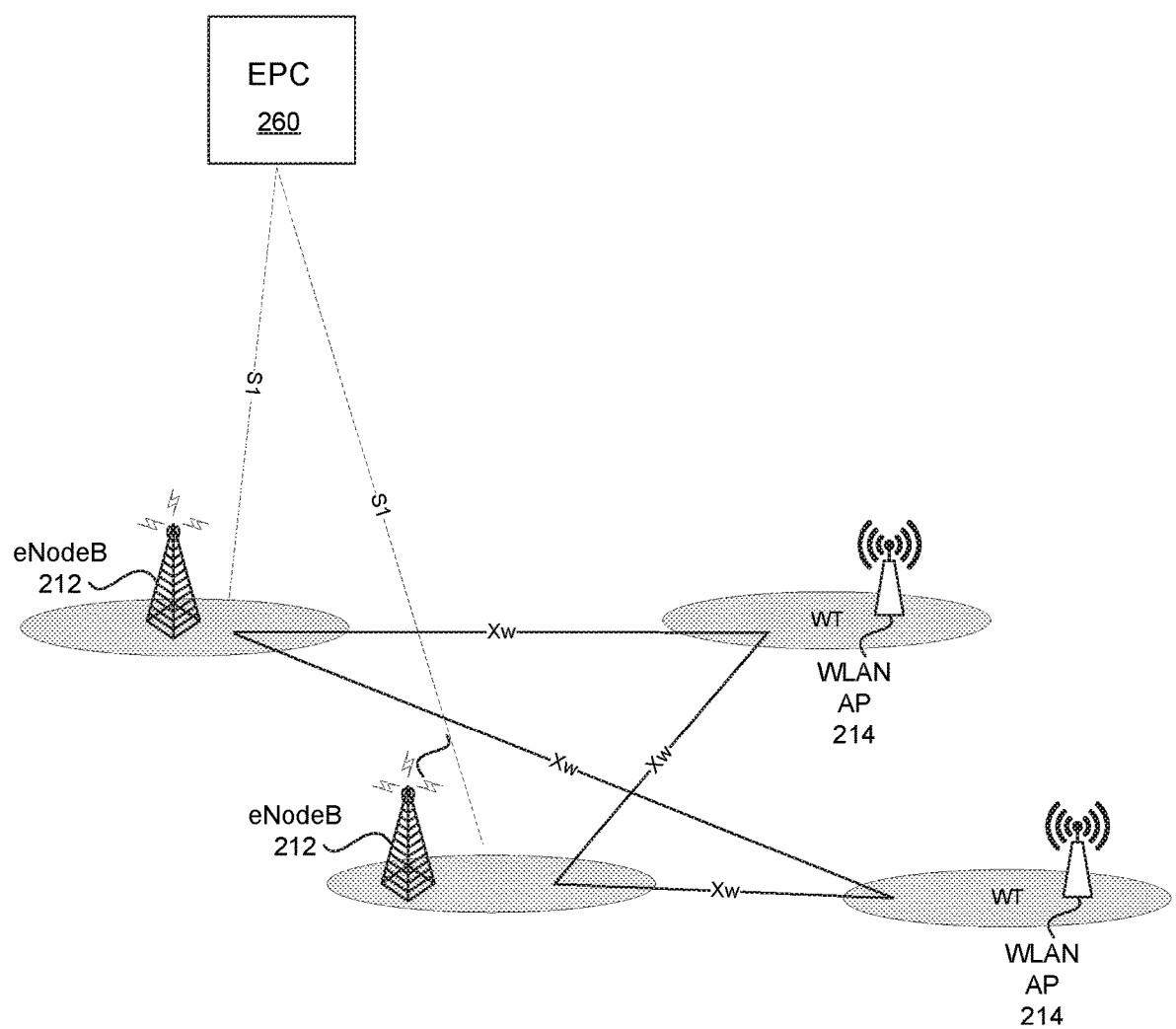
FIG. 2 illustrates a non-collocated long-term evolution (LTE) and wireless local area network (WLAN) aggregation (LWA) architecture in accordance with an example.

FIG. 2 illustrates a non-collocated long-term evolution (LTE) and wireless local area network (WLAN) aggregation (LWA) architecture in accordance with an example. In one aspect, one or more eNodeBs 212 and one or more wireless local area network (WLAN) access points (AP) 214 may be in communication with an evolved packet core (EPC) 260. Moreover, the eNodeB can perform an LTE-WLAN aggregation (LWA) operation whereby a UE in an radio resource control (RRC) CONNECTED state (e.g., RRC connection has been established) is configured by the eNB to utilize radio resources of LTE and WLAN. In one aspect, a collocated long-term evolution (LTE) and wireless local area network (WLAN) aggregation (LWA) architecture can involve two scenarios, depending on the backhaul connection between the LTE and the WLAN. First, the long-term evolution (LTE) and wireless local area network (WLAN) aggregation (LWA) architecture can support a non-collocated LWA scenario for a non-ideal backhaul and/or support a collocated LWA scenario for an ideal/internal backhaul.

In one aspect, in the non-collocated LWA scenario, the eNB 212 can be connected to one or more WLAN Terminations (WT) 114 via an Xw interface. In contrast, in the collocated LWA scenario, the interface between LTE and WLAN can be based and dependent upon the wireless network implementation.

In one aspect, as depicted in FIG. 2, an architecture for the non-collocated LWA scenario is illustrated where the WT (e.g., WLAN AP 214) terminates at the Xw interface for WLAN. The eNodeB can communicate with the EPC 260 via the S1 interface. It should be noted that WT can be a logical node and 3GPP LTE does not specify where the WT is implemented.

Figure 3A:
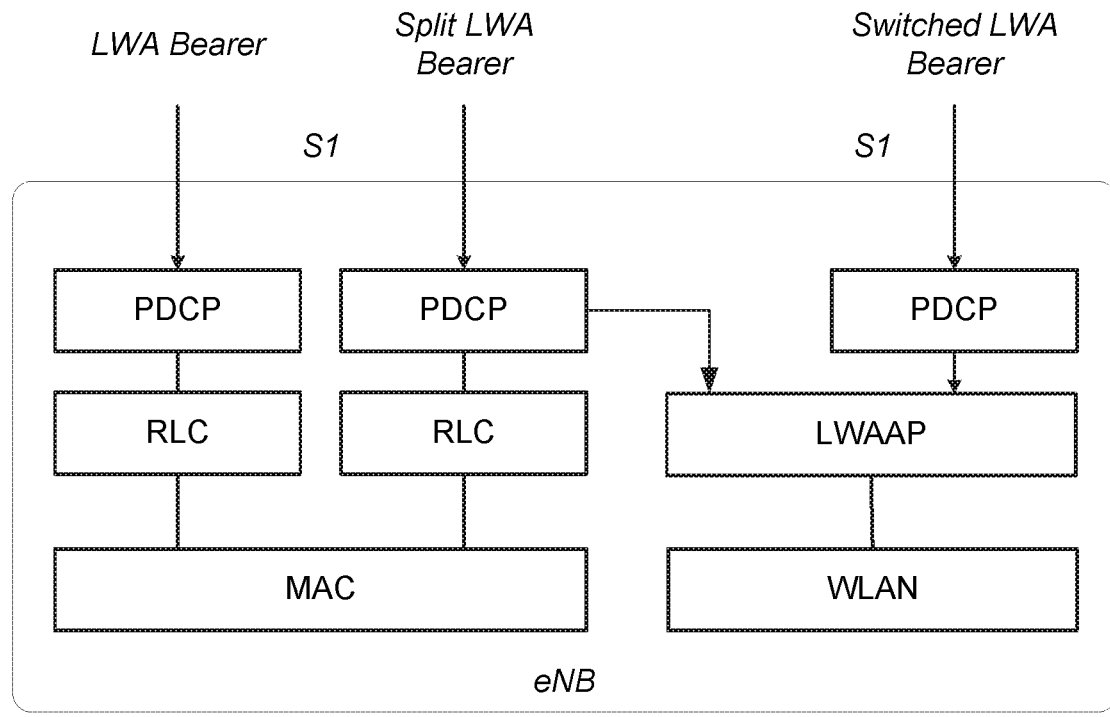
FIG. 3A illustrates a collocated long-term evolution (LTE) and wireless local area network (WLAN) aggregation (LWA) radio protocol architecture in accordance in accordance with an example.
Figure 3B:
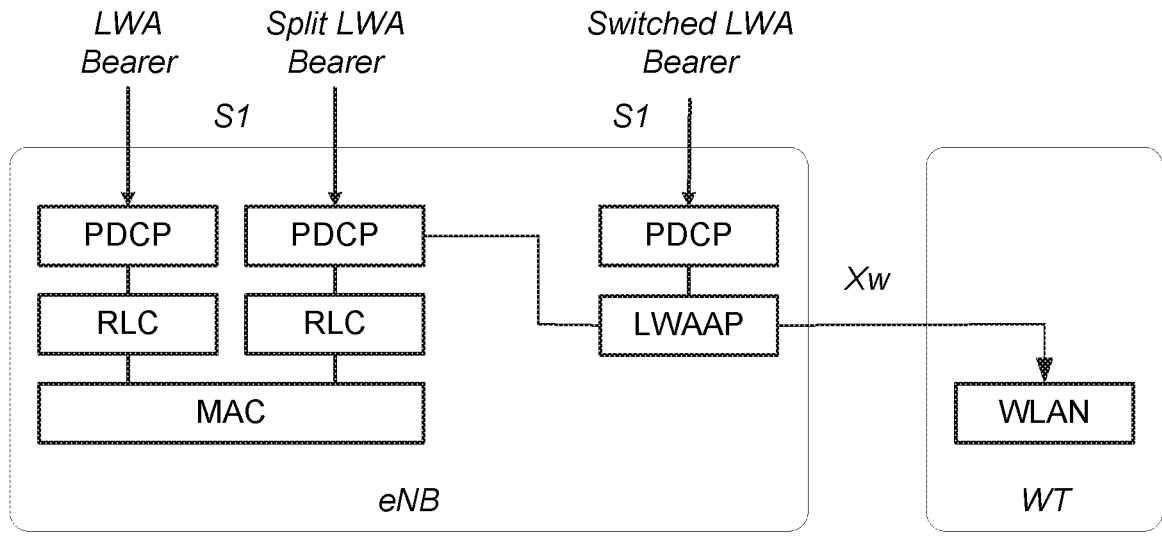
FIG. 3B illustrates a non-collocated long-term evolution (LTE) and wireless local area network (WLAN) aggregation (LWA) radio protocol architecture in accordance in accordance with an example.

Tuning now to FIGS. 3A-3B, a collocated long-term evolution (LTE) and wireless local area network (WLAN) aggregation (LWA) radio protocol architecture 300 and a non-collocated long-term evolution (LTE) and wireless local area network (WLAN) aggregation (LWA) radio protocol architecture 325 is depicted. For example, FIGS. 3A-3B can include elements of an evolved universal terrestrial radio access network (EUTRAN) protocol including, for example, a media access control (MAC) layer, a radio link control (RLC) layer, and a packet data convergence protocol (PDCP) layer. The EUTRAN protocols can communicate with a WLAN via an LTE-WLAN Aggregation Adaptation Protocol (LWAAP).

In one aspect, in LWA, the radio protocol architecture that a particular bearer uses can depend on the LWA backhaul scenario and how the bearer is set up, as indicated in FIG. 2. In one aspect, an E-UTRAN system can include eNodeBs, providing the E-UTRA user plane, which can include packet data convergence protocol (PDCP), radio link control (RLC), media access control (MAC) and the physical layer (PHY) (e.g., Layer 1) and control plane (RRC) protocol terminations towards the UE. In FIG. 3B, the LTE-WLAN Aggregation Adaptation Protocol (LWAAP) in an eNB can be in communication via an Xw interface with a WLAN Termination (WT), which can be a logical node that terminates the Xw interface on the WLAN side.

Two bearer types can exist for LWA: 1) a split LWA bearer and 3) a switched LWA bearer. Those two bearer can be depicted for the collocated scenario in FIG. 3A and depicted for the non-collocated scenario in FIG. 3B. In one aspect, an LTE bearer in an LTE-WLAN Aggregation can be a bearer whose radio protocols are located in the eNB to use eNB radio resources only. The LWA bearer in LTE-WLAN Aggregation, can be a bearer whose radio protocols are located in both the eNB and the WLAN to use both eNB and WLAN resources. The split bearer, in dual connectivity, can be a bearer whose radio protocols can be located in both a master eNB (MeNB) and a secondary eNodeB (SeNB) to use both MeNB and SeNB resources. The Split LWA bearer in LTE-WLAN Aggregation can be a bearer whose radio protocols are located in both the eNB and the WLAN to use both eNB and WLAN radio resources. The Switched LWA bearer in LTE-WLAN Aggregation can be a bearer whose radio protocols are located in both the eNB and the WLAN but uses WLAN radio resources only.

FIG. 4 illustrates long-term evolution (LTE) and wireless local area network (WLAN) aggregation (LWA) using a wireless local area network (WLAN) connection status report message for suspending or resuming the communication of the one or more packet data units (PDUs) on the WLAN for the LWA session. That is, FIG. 4 illustrates pseudo code and a definition table for the pseudo code for long-term evolution (LTE) and wireless local area network (WLAN) aggregation (LWA) using a wireless local area network (WLAN) connection status report message for suspending or resuming the communication of the one or more packet data units (PDUs) on the WLAN for the LWA session. In one aspect, the purpose of the WLAN Connection Status Reporting procedure is to provide feedback to the eNB related to the WLAN status and operation.

RRC Signalling Through WLAN Connection Status Report Procedure

In one aspect, to facilitate the functionality of suspending or resuming the communication of the one or more packet data units (PDUs) on the WLAN for the LWA session, the technology can indicate to the eNB that transmission of LWA PDUs on WLAN should be suspended or resumed.

In one aspect, the UE may send a "Suspend/Resume" indication to the eNB using a Radio Resource control (RRC) signaling message through a WLAN Connection Status Report procedure. In one aspect, the WLAN Connection Status Report procedure can be used to inform the eNB when the UE loses connection to the configured WLAN mobility set for any reason. In some examples it is extended to also report a "suspended/resumed" status for the WLAN link of the LWA session.

Dedicated RRC Signaling Message with Response from eNB

In some embodiments a new RRC message WLAN suspend request (e.g., "WLANSuspendReq" message) can be provided to notify the eNB about the desire of the UE to suspend the transmission on WLAN for the LWA session. After the eNB receives the WLANSuspendReq message, the eNB may reply with a WLAN suspend confirmation (e.g., "WLANSuspendCnf") to indicate that the LWA session is suspended from the eNB side. Alternatively, the eNB may reject the UE request by sending a WLANSuspendCnf with a status Reject. To resume WLAN transmission for LWA, the UE may send a WLAN Connection Status Report with status: resumed. The UE may not actually suspend LWA unless the eNB confirms the suspend request. This may guarantee LWA status is synchronized with the eNB and can help avoid the case where the eNB detects e.g., too frequent UE suspend/resume requests or too many lost packets occur and decides to terminate the LWA entirely.

In-Band Signaling (New Message)

In another embodiment, a new Packet Data Convergence Protocol (PDCP) In-Band message can be used to inform the eNB whenever the LWA service is suspended/resumed. It can be noted, that even though PDCP signaling may be per bearer, this indication may carry the status for the complete session, and not per bearer.

In-Band Signaling (within EPDCP Status Reporting/UE Flow Control)

In another embodiment, an Evolved Packet Data Convergence Protocol (EPDCP) status reporting and/or UE flow control messaging can be extended to include the suspend/resume status. If the reporting is per bearer, the UE may indicate that a bearer is suspended and the eNB can be configured to interpret this as a total LWA suspend message. There may be no use case for suspending a single bearer while keeping the other split bearers active. In some embodiments all bearers may not be suspended individually.

Alternatively in-band signaling methods, such as the use of Activation/Deactivation Media Access Control (MAC) control elements may be used, wherein the UE initiates activation/deactivation of a particular Secondary WLAN cell. This may allow for the eNB to confirm whether the WLAN cell has been activated or deactivated.

Thus, using the embodiments described in FIGS. 1-3, in one aspect, a UE can include a Wireless Local Area Network (WLAN) transceiver to communicate with a WLAN, a cellular transceiver to communicate via a cellular link, and a LTE/WLAN Aggregation. The UE can request the eNB to suspend the transmission on WLAN of PDUs belonging to the LWA split bearer. The UE can request the eNB to resume the transmission on WLAN of PDUs belonging to the LWA split bearer. The UE can use RRC signaling to request the eNB to suspend or resume the transmission on WLAN of PDUs belonging to the LWA split bearer. The UE can use in-band signaling (e.g., PDCP or MAC CE) to request the eNB to suspend or resume the transmission on WLAN of PDUs belonging to the LWA split bearer. The RRC message can be the enhanced WLAN Connection Status Report message.

Figure 5:
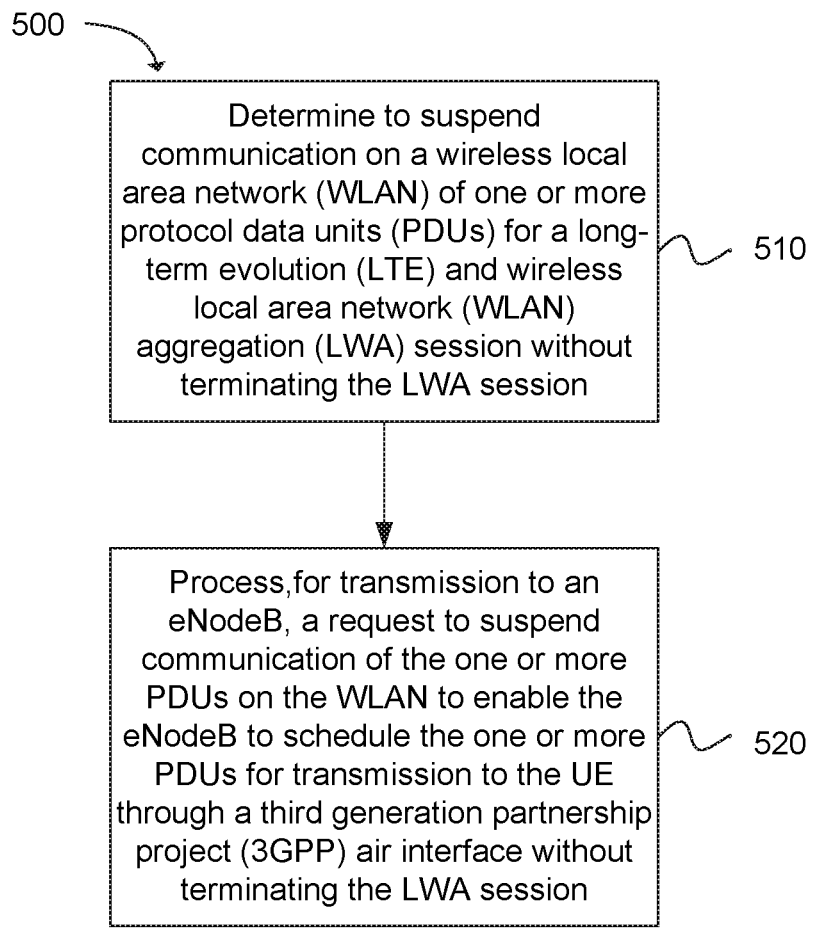
FIG. 5 depicts functionality of a user equipment (UE) to perform long-term evolution (LTE) and wireless local area network (WLAN) aggregation (LWA) in accordance with an example.

Another example provides functionality 500 of a user equipment (UE) operable to perform long-term evolution (LTE) and wireless local area network (WLAN) Wireless local area network (WLAN) aggregation (LWA), as shown in the flow chart in FIG. 5. The functionality can be implemented as a method or the functionality can be executed as instructions on a machine, where the instructions are included one or more computer readable mediums or one or more transitory or non-transitory machine readable storage mediums. The UE can comprise one or more processors and memory configured to: determine to suspend communication on a wireless local area network (WLAN) of one or more protocol data units (PDUs) for an LWA session without terminating the LWA session, as in block 510. The UE can comprise one or more processors and memory configured to: process, for transmission to an eNodeB, a request to suspend communication of the one or more PDUs on the WLAN to enable the eNodeB to schedule the one or more PDUs for transmission to the UE through a third generation partnership project (3GPP) air interface without terminating the LWA session, as in block 520.

In one aspect, the functionality of 500 can include one or more of the following. In one aspect, the UE can process, for transmission to the eNodeB, a request to suspend communication of the one or more PDUs on the WLAN belonging to an LWA split bearer. The UE can process, for transmission to the eNodeB, a request to resume the communication of the one or more PDUs on the WLAN for the LWA session. The UE can process, for transmission to the eNodeB, a request to resume the communication of the one or more PDUs on the WLAN belonging to an LWA split bearer. The UE can process, for transmission using radio resource control (RRC) signaling message, a request to the eNB to suspend or resume the communication of the one or more PDUs on the WLAN for the LWA session. In one example, the RRC signaling message can be included in the enhanced WLAN Connection Status Report message.

The UE can, process for transmission using in-band signaling, a request to the eNB to suspend or resume the communication of the one or more PDUs on the WLAN for the LWA session. The UE can process, for transmission using a packet data convergence protocol (PDCP) signal or a media access control (MAC) control element (CE), a request to the eNB to suspend or resume the communication of the one or more PDUs on the WLAN for the LWA session. The UE can process, a suspend confirmation message received, from the eNodeB, indicating that the LWA session on the WLAN is suspended. The UE can process, a suspend rejection message received, from the eNodeB, indicating the LWA session on the WLAN is not suspended.

Figure 6:
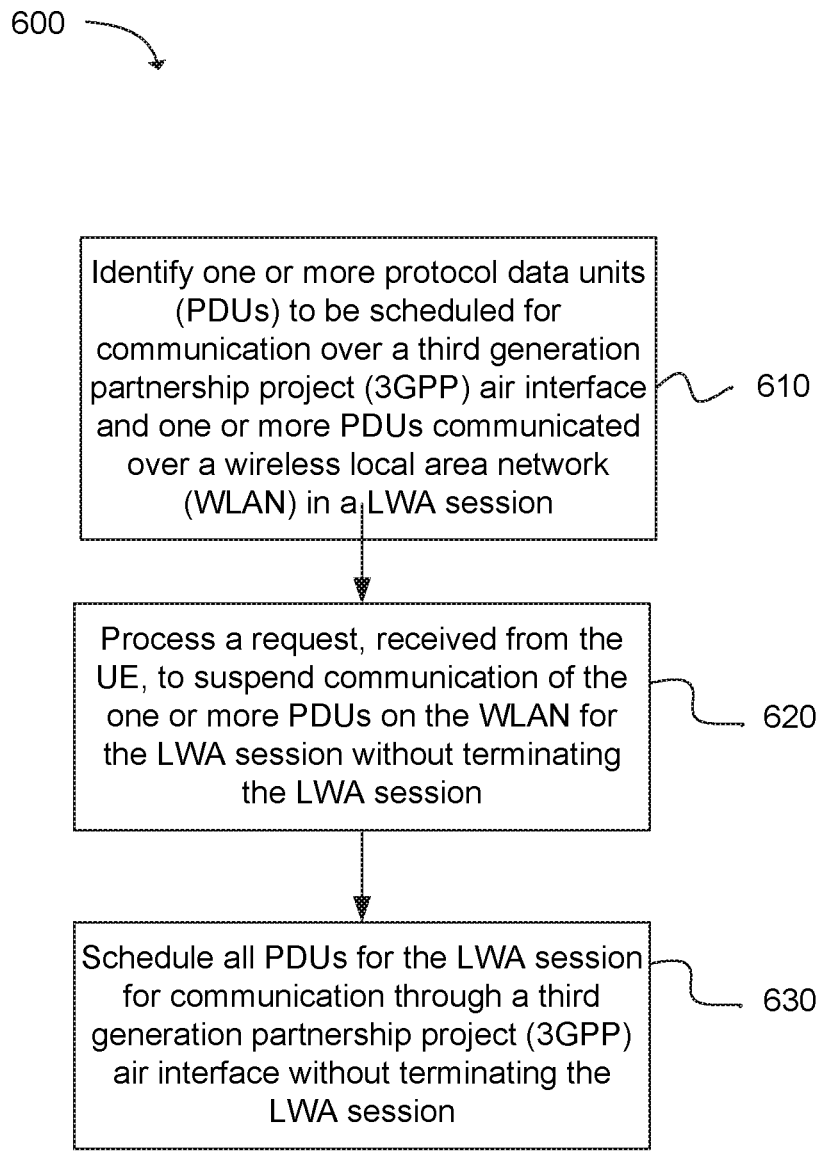
FIG. 6 depicts functionality of an eNodeB to suspend communication of protocol data units (PDUs) in accordance with an example.

Another example provides functionality 600 of an eNodeB operable to suspend communication of protocol data units (PDUs), as shown in the flow chart in FIG. 6. Generally speaking, FIG. 6 can illustrate a network suspending communication, such as, for example, the network having the eNodeB and the eNodeB being configured to suspend the communication of the PDUs over a 3GPP air interface. The functionality can be implemented as a method or the functionality can be executed as instructions on a machine, where the instructions are included one or more computer readable mediums or one or more transitory or non-transitory machine readable storage mediums. The eNodeB can comprise one or more processors and memory configured to: Identify one or more protocol data units (PDUs) to be scheduled for communication over a third generation partnership project (3GPP) air interface and one or more PDUs communicated over a wireless local area network (WLAN) in a LWA session, as in block 610. The eNodeB can comprise one or more processors and memory configured to: process a request, received from the UE, to suspend communication of the one or more PDUs on the WLAN for the LWA session without terminating the LWA session, as in block 620. The eNodeB can comprise one or more processors and memory configured to: schedule all PDUs for the LWA session for communication through a third generation partnership project (3GPP) air interface without terminating the LWA session, as in block 630.

It should be noted that an LWA session can be suspended for a selected period of time. The suspended period of time can be indicated by the UE and/or determined by the eNB. For example, a LWA session can be suspended for period of time where 1) no time indication is received from the UE, 2) no time indication is received from the UE, but there is a constraint that the UE should not stay in a suspended mode on the WLAN longer than specified and/or selected time limit. If the UE exceeds the specified and/or selected time limit, the eNodeB can decide whether to terminate the suspension, terminate the LWA session, and/or resume transmission of the PDUs on the WLAN. 3) The UE can indicate and signal to the eNodeB how long the UE intends to stay suspended.

Figure 7:
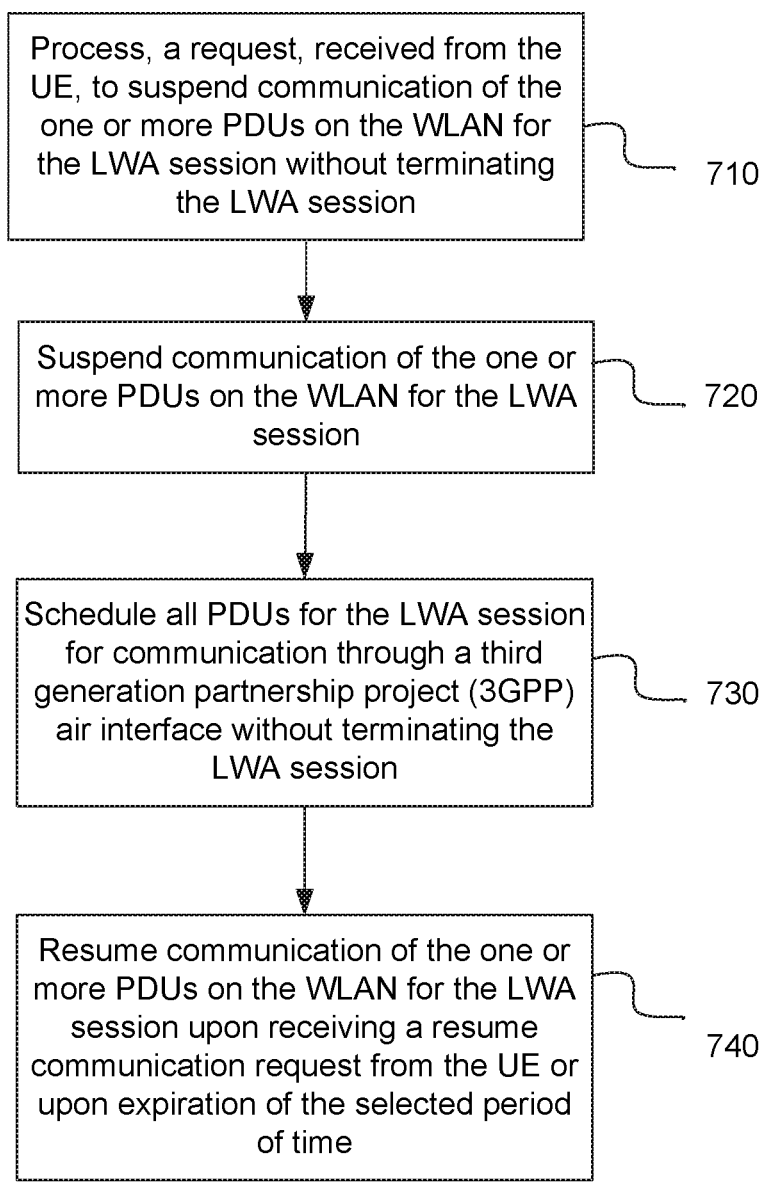
FIG. 7 depicts functionality of an eNodeB to perform long-term evolution (LTE) and wireless local area network (WLAN) aggregation (LWA within a wireless communication network in accordance with an example.

Another example provides functionality 700 of an eNodeB operable to perform long-term evolution (LTE) and wireless local area network (WLAN) Wireless local area network (WLAN) aggregation (LWA), as shown in the flow chart in FIG. 7. The functionality can be implemented as a method or the functionality can be executed as instructions on a machine, where the instructions are included one or more computer readable mediums or one or more transitory or non-transitory machine readable storage mediums. The eNodeB can comprise one or more processors and memory configured to: process a request, received from the UE, to suspend communication of the one or more PDUs on the WLAN for the LWA session without terminating the LWA session, as in block 710. In one aspect, as part of block 710, a determination can be made by the eNodeB to suspend communication on a wireless local area network (WLAN) of one or more protocol data units (PDUs) for a LWA session without terminating the LWA session, if necessary, following the request to suspend received from a UE.

The eNodeB can comprise one or more processors and memory configured to: suspend communication of the one or more PDUs on the WLAN for the LWA session for a selected period of time, as in block 720. The eNodeB can comprise one or more processors and memory configured to: schedule all PDUs for the LWA session for communication through a third generation partnership project (3GPP) air interface without terminating the LWA session, as in block 730. The eNodeB can comprise one or more processors and memory configured to: resume communication of the one or more PDUs on the WLAN for the LWA session upon receiving a resume communication request from the UE or upon expiration of the selected period of time, as in block 740.

In one aspect, the functionality of 600 and/or 700 can include one or more of the following. In one aspect, the EnodeB can process a request, received from the UE, to suspend communication of the one or more PDUs on the WLAN belonging to a LWA split bearer. In one aspect, the EnodeB can process a request, received from the UE, to resume the communication of the one or more PDUs on the WLAN for the LWA session. In one aspect, the EnodeB can process a request, received from the UE, to resume the communication of the one or more PDUs on the WLAN belonging to a LWA split bearer. The eNodeB can process a request, using radio resource control (RRC) signaling message received from the UE, to suspend or resume the communication of the one or more PDUs on the WLAN for the LWA session, wherein the RRC signaling is the enhanced WLAN Connection Status Report message. The eNodeB can process a request, using in-band signaling received from the UE, to suspend or resume the communication of the one or more PDUs on the WLAN for the LWA session. The eNodeB can process a request, using a packet data convergence protocol (PDCP) signal or a media access control (MAC) control element (CE) received from the UE, to suspend or resume the communication of the one or more PDUs on the WLAN for the LWA session. The eNodeB can process, for transmission to the UE, a suspend confirmation message indicating the LWA session on the WLAN is suspended. The eNodeB can process, for transmission to the UE, a suspend rejection message indicating the LWA session on the WLAN is not suspended. The eNodeB can suspend communication of the one or more PDUs on the WLAN for the LWA session.

Figure 8:
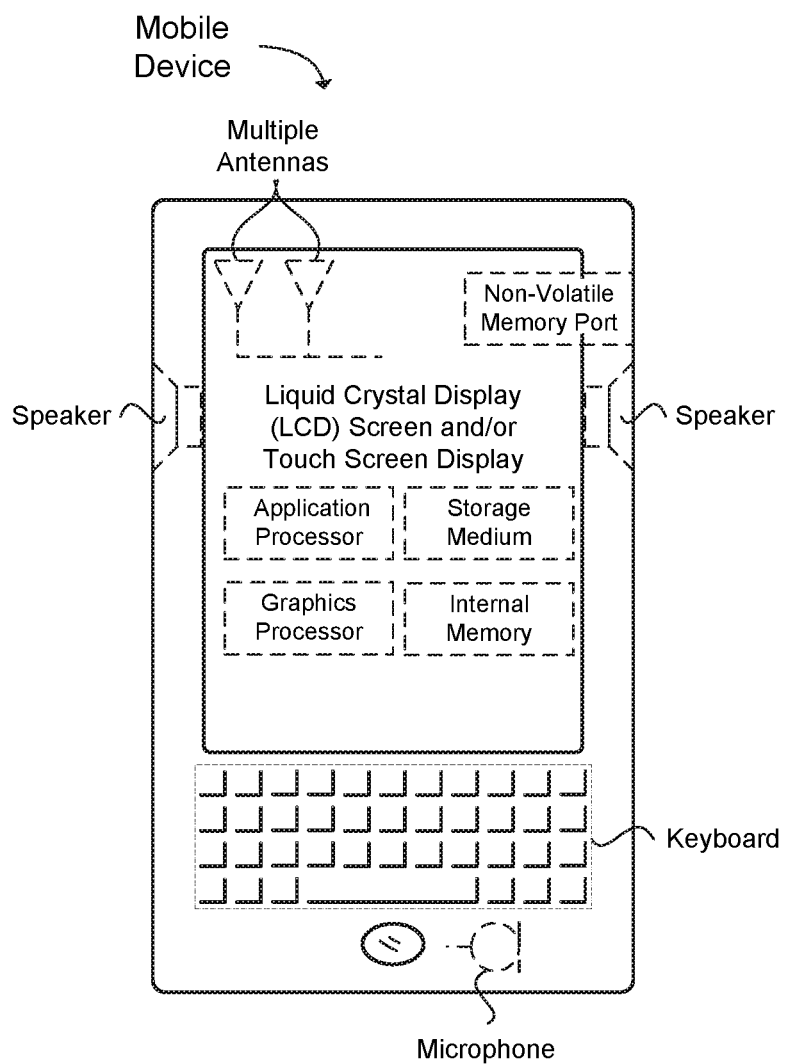
FIG. 8 illustrates a diagram of example components of a wireless device (e.g. User Equipment "UE") device in accordance with an example.

FIG. 8 illustrates a diagram of a wireless device (e.g., UE) in accordance with an example. FIG. 8 provides an example illustration of the wireless device, such as a user equipment (UE) UE, a mobile station (MS), a mobile wireless device, a mobile communication device, a tablet, a handset, or other type of wireless device. In one aspect, the wireless device can include at least one of an antenna, a touch sensitive display screen, a speaker, a microphone, a graphics processor, a baseband processor, an application processor, internal memory, a non-volatile memory port, and combinations thereof.

The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The mobile device can include a storage medium. In one aspect, the storage medium can be associated with and/or communicate with the application processor, the graphics processor, the display, the non-volatile memory port, and/or internal memory. In one aspect, the application processor and graphics processor are storage mediums.

Figure 9:
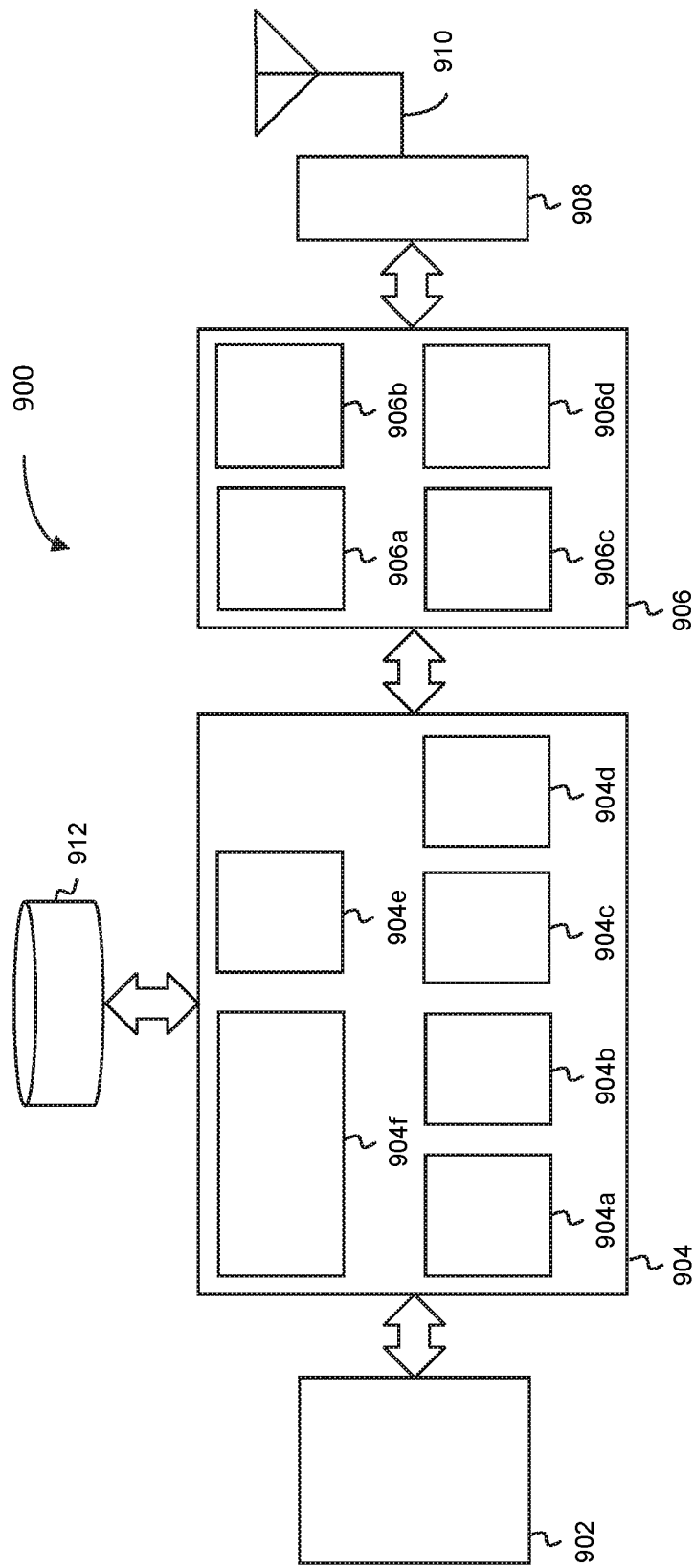
FIG. 9 illustrates a diagram of example components of a User Equipment (UE) device in accordance with an example.

FIG. 9 illustrates a diagram of example components of a User Equipment (UE) device in accordance with an example. FIG. 9 illustrates, in one aspect, for example, components of a User Equipment (UE) device 900. In some aspects, the UE device 900 can include application circuitry 902, baseband circuitry 904, Radio Frequency (RF) circuitry 906, front-end module (FEM) circuitry 908 and one or more antennas 910, coupled together at least as shown.

The application circuitry 902 can include one or more application processors. For example, the application circuitry 902 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The processor(s) can include any combination of general-purpose processors and dedicated processors (e.g., graphics processors, application processors, etc.). The processors can be coupled with and/or can include a storage medium 912, and can be configured to execute instructions stored in the storage medium 912 to enable various applications and/or operating systems to run on the system.

The baseband circuitry 904 can include circuitry such as, but not limited to, one or more single-core or multi-core processors. The baseband circuitry 904 can include one or more baseband processors and/or control logic to process baseband signals received from a receive signal path of the RF circuitry 906 and to generate baseband signals for a transmit signal path of the RF circuitry 906. Baseband processing circuitry 904 can interface with the application circuitry 902 for generation and processing of the baseband signals and for controlling operations of the RF circuitry 906. For example, in some aspects, the baseband circuitry 904 can include a second generation (2G) baseband processor 904a, third generation (3G) baseband processor 904b, fourth generation (4G) baseband processor 904c, and/or other baseband processor(s) 904d for other existing generations, generations in development or to be developed in the future (e.g., fifth generation (5G), 6G, etc.). The baseband circuitry 904 (e.g., one or more of baseband processors 904a-d) can handle various radio control functions that enable communication with one or more radio networks via the RF circuitry 906. The radio control functions can include, but are not limited to, signal modulation/demodulation, encoding/decoding, radio frequency shifting, etc. In some aspects, modulation/demodulation circuitry of the baseband circuitry 904 can include Fast-Fourier Transform (FFT), precoding, and/or constellation mapping/demapping functionality. In some aspects, encoding/decoding circuitry of the baseband circuitry 904 can include convolution, tail-biting convolution, turbo, Viterbi, and/or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 904 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 904e of the baseband circuitry 904 can be configured to run elements of the protocol stack for signaling of the PHY, MAC, RLC, PDCP and/or RRC layers. In some aspects, the baseband circuitry can include one or more audio digital signal processor(s) (DSP) 904f The audio DSP(s) 904f can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 904 and the application circuitry 902 can be implemented together such as, for example, on a system on a chip (SOC).

In some aspects, the baseband circuitry 904 can provide for communication compatible with one or more radio technologies. For example, in some aspects, the baseband circuitry 904 can support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 904 is configured to support radio communications of more than one wireless protocol can be referred to as multi-mode baseband circuitry.

RF circuitry 906 can enable communication with wireless networks using modulated electromagnetic radiation through a non-solid medium. In various aspects, the RF circuitry 906 can include switches, filters, amplifiers, etc. to facilitate the communication with the wireless network. RF circuitry 906 can include a receive signal path which can include circuitry to down-convert RF signals received from the FEM circuitry 908 and provide baseband signals to the baseband circuitry 904. RF circuitry 906 can also include a transmit signal path which can include circuitry to up-convert baseband signals provided by the baseband circuitry 904 and provide RF output signals to the FEM circuitry 908 for transmission.

In some aspects, the RF circuitry 906 can include a receive signal path and a transmit signal path. The receive signal path of the RF circuitry 906 can include mixer circuitry 906a, amplifier circuitry 906b and filter circuitry 906c. The transmit signal path of the RF circuitry 906 can include filter circuitry 906c and mixer circuitry 906a. RF circuitry 906 can also include synthesizer circuitry 906d for synthesizing a frequency for use by the mixer circuitry 906a of the receive signal path and the transmit signal path. In some aspects, the mixer circuitry 906a of the receive signal path can be configured to down-convert RF signals received from the FEM circuitry 908 based on the synthesized frequency provided by synthesizer circuitry 906d. The amplifier circuitry 906b can be configured to amplify the down-converted signals and the filter circuitry 906c can be a low-pass filter (LPF) or band-pass filter (BPF) configured to remove unwanted signals from the down-converted signals to generate output baseband signals. Output baseband signals can be provided to the baseband circuitry 904 for further processing. In some aspects, the output baseband signals can be zero-frequency baseband signals, although the output baseband signals do not have to be zero-frequency baseband signals. In some aspects, mixer circuitry 906a of the receive signal path can comprise passive mixers, although the scope of the aspects is not limited in this respect.

In some aspects, the mixer circuitry 906a of the transmit signal path can be configured to up-convert input baseband signals based on the synthesized frequency provided by the synthesizer circuitry 906d to generate RF output signals for the FEM circuitry 908. The baseband signals can be provided by the baseband circuitry 904 and can be filtered by filter circuitry 906c. The filter circuitry 906c can include a low-pass filter (LPF), although the scope of the aspects is not limited in this respect.

In some aspects, the mixer circuitry 906a of the receive signal path and the mixer circuitry 906a of the transmit signal path can include two or more mixers and can be arranged for quadrature downconversion and/or upconversion respectively. In some aspects, the mixer circuitry 906a of the receive signal path and the mixer circuitry 906a of the transmit signal path can include two or more mixers and can be arranged for image rejection (e.g., Hartley image rejection). In some aspects, the mixer circuitry 906a of the receive signal path and the mixer circuitry 906a can be arranged for direct downconversion and/or direct upconversion, respectively. In some aspects, the mixer circuitry 906*a* of the receive signal path and the mixer circuitry 906*a* of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 906 can include analog-to-digital converter (ADC) and digital-to-analog converter (DAC) circuitry and the baseband circuitry 904 can include a digital baseband interface to communicate with the RF circuitry 906.

In some dual-mode embodiments, a separate radio IC circuitry can be provided for processing signals for each spectrum, although the scope of the embodiments is not limited in this respect.

In some embodiments, the synthesizer circuitry 906*d* can be a fractional-N synthesizer or a fractional N/N+1 synthesizer, although the scope of the embodiments is not limited in this respect as other types of frequency synthesizers can be suitable. For example, synthesizer circuitry 906*d* can be a delta-sigma synthesizer, a frequency multiplier, or a synthesizer comprising a phase-locked loop with a frequency divider.

The synthesizer circuitry 906*d* can be configured to synthesize an output frequency for use by the mixer circuitry 906*a* of the RF circuitry 906 based on a frequency input and a divider control input. In some embodiments, the synthesizer circuitry 906*d* can be a fractional N/N+1 synthesizer.

In some embodiments, frequency input can be provided by a voltage controlled oscillator (VCO), although that is not a constraint. Divider control input can be provided by either the baseband circuitry 904 or the applications processor 902 depending on the desired output frequency. In some embodiments, a divider control input (e.g., N) can be determined from a look-up table based on a channel indicated by the applications processor 902.

Synthesizer circuitry 906*d* of the RF circuitry 906 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 906*d* can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 906 can include an IQ/polar converter.

FEM circuitry 908 can include a receive signal path which can include circuitry configured to operate on RF signals received from one or more antennas 910, amplify the received signals and provide the amplified versions of the received signals to the RF circuitry 906 for further processing. FEM circuitry 908 can also include a transmit signal path which can include circuitry configured to amplify signals for transmission provided by the RF circuitry 906 for transmission by one or more of the one or more antennas 910.

In some embodiments, the FEM circuitry 908 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 906). The transmit signal path of the FEM circuitry 908 can include a power amplifier (PA) to amplify input RF signals (e.g., provided by RF circuitry 906), and one or more filters to generate RF signals for subsequent transmission (e.g., by one or more of the one or more antennas 910.

In some embodiments, the UE device 900 can include additional elements such as, for example, memory/storage, display, camera, sensor, and/or input/output (I/O) interface.

Figure 10:
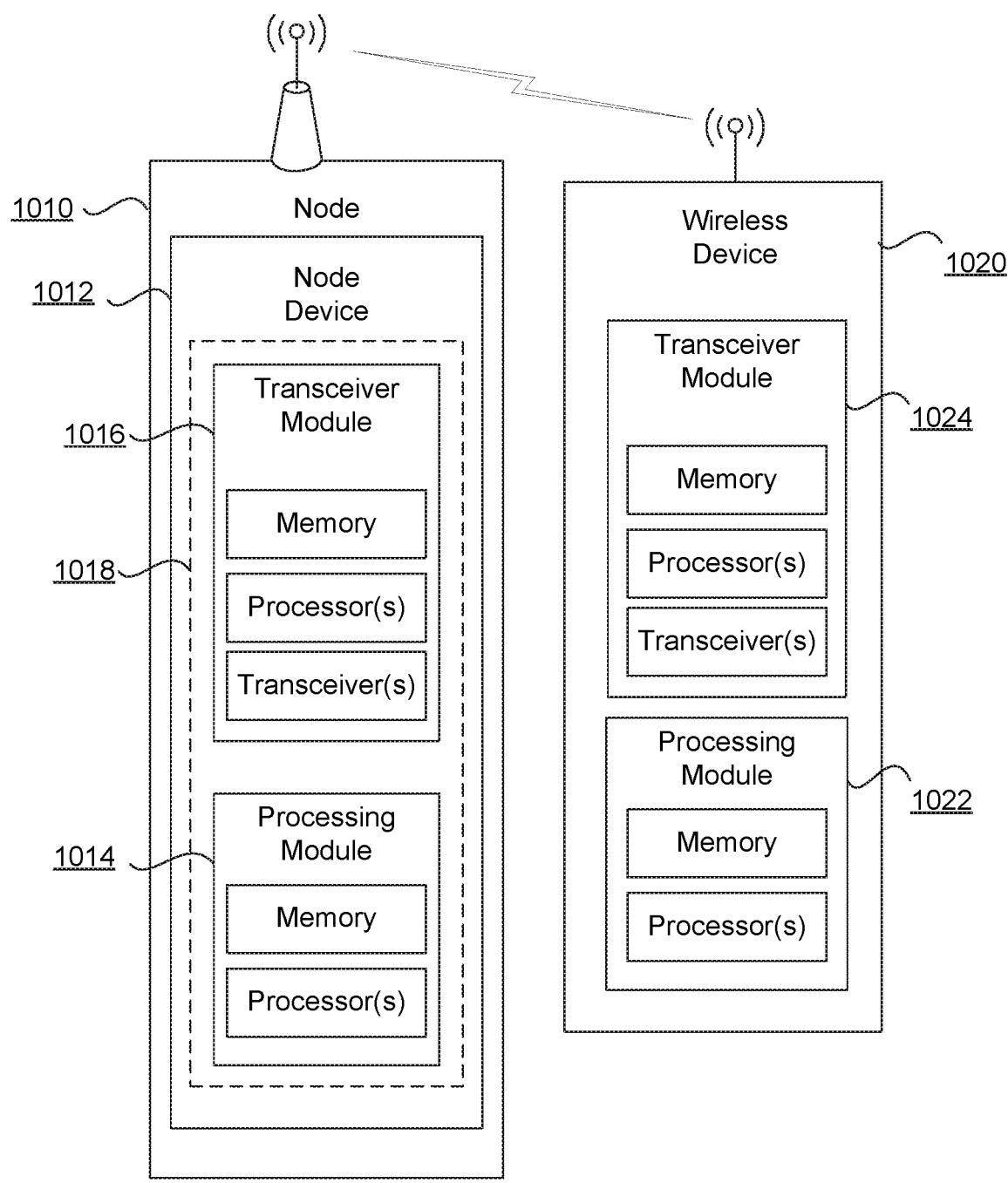
FIG. 10 illustrates a diagram of a node (e.g., eNB) and wireless device (e.g., UE) in accordance with an example.

FIG. 10 illustrates a diagram 1000 of a node 1010 (e.g., eNB and/or a base station) and wireless device (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 1010 can include a node device 1012. The node device 1012 or the node 1010 can be configured to communicate with the wireless device 1020. The node device 1012 can be configured to implement the technology described. The node device 1012 can include a processing module 1014 and a transceiver module 1016. In one aspect, the node device 1012 can include the transceiver module 1016 and the processing module 1014 forming a circuitry 1018 for the node 1010. In one aspect, the transceiver module 1016 and the processing module 1014 can form a circuitry of the node device 1012. The processing module 1014 can include one or more processors and memory. In one embodiment, the processing module 1022 can include one or more application processors. The transceiver module 1016 can include a transceiver and one or more processors and memory. In one embodiment, the transceiver module 1016 can include a baseband processor.

The wireless device 1020 can include a transceiver module 1024 and a processing module 1022. The processing module 1022 can include one or more processors and memory. In one embodiment, the processing module 1022 can include one or more application processors. The transceiver module 1024 can include a transceiver and one or more processors and memory. In one embodiment, the transceiver module 1024 can include a baseband processor. The wireless device 1020 can be configured to implement the technology described. The node 1010 and the wireless devices 1020 can also include one or more storage mediums, such as the transceiver module 1016, 1024 and/or the processing module 1014, 1022. In one aspect, the components described herein of the transceiver module 1016 can be included in one or more separate devices that may used in a cloud-RAN (C-RAN) environment.

EXAMPLES

The following examples pertain to specific technology embodiments and point out specific features, elements, or steps that can be used or otherwise combined in achieving such embodiments.

Example 1 includes an apparatus of a user equipment (UE), the UE configured to perform long-term evolution (LTE) and wireless local area network (WLAN) aggregation (LWA), the apparatus comprising one or more processors and memory configured to: determine to suspend communication on a wireless local area network (WLAN) of one or more protocol data units (PDUs) for a LWA session without terminating the LWA session; and process, for transmission to an eNodeB, a request to suspend communication of the one or more PDUs on the WLAN to enable the eNodeB to schedule the one or more PDUs for transmission to the UE through a third generation partnership project (3GPP) air interface without terminating the LWA session.

Example 2 includes the apparatus of example 1, wherein the one or more processors and memory are further configured to process, for transmission to the eNodeB, a request to suspend communication of the one or more PDUs on the WLAN belonging to a LWA split bearer.

Example 3 includes the apparatus of example 1 or 2, wherein the one or more processors and memory are further configured to process, for transmission to the eNodeB, a request to resume the communication of the one or more PDUs on the WLAN for the LWA session.

Example 4 includes the apparatus of example 1 or 2, wherein the one or more processors and memory are further configured to process, for transmission to the eNodeB, a request to resume the communication of the one or more PDUs on the WLAN belonging to a LWA split bearer.

Example 5 includes the apparatus of example 2 or 3, wherein the one or more processors and memory are further configured to process, for transmission using radio resource control (RRC) signaling message, a request to the eNB to suspend or resume the communication of the one or more PDUs on the WLAN for the LWA session.

Example 6 includes the apparatus of example 5, wherein the RRC signaling is the enhanced WLAN Connection Status Report message.

Example 7 includes the apparatus of example 2 or 3, wherein the one or more processors and memory are further configured to process, for transmission using in-band signaling, a request to the eNB to suspend or resume the communication of the one or more PDUs on the WLAN for the LWA session.

Example 8 includes the apparatus of example 2 or 3, wherein the one or more processors and memory are further configured to process, for transmission using a packet data convergence protocol (PDCP) signal or a media access control (MAC) control element (CE), a request to the eNB to suspend or resume the communication of the one or more PDUs on the WLAN for the LWA session.

Example 9 includes the apparatus of example 1, wherein the one or more processors and memory are further configured to process, a suspend confirmation message received, from the eNodeB, indicating that the LWA session on the WLAN is suspended.

Example 10 includes the apparatus of example 1, wherein the one or more processors and memory are further configured to process, a suspend rejection message received, from the eNodeB, indicating the LWA session on the WLAN is not suspended.

Example 11 includes the apparatus of example 1, wherein the apparatus includes at least one of an antenna, a touch sensitive display screen, a speaker, a microphone, a graphics processor, a baseband processor, an application processor, internal memory, a non-volatile memory port, and combinations thereof.

Example 12 includes an apparatus of an eNodeB, the eNodeB configured to perform long-term evolution (LTE) and wireless local area network (WLAN) aggregation (LWA) with a user equipment (UE), the apparatus comprising one or more processors and memory configured to: identify one or more protocol data units (PDUs) to be scheduled for communication over a third generation partnership project (3GPP) air interface and one or more PDUs communicated over a wireless local area network (WLAN) in a LWA session; process a request, received from the UE, to suspend communication of the one or more PDUs on the WLAN for the LWA session without terminating the LWA session; and schedule all PDUs for the LWA session for communication through a third generation partnership project (3GPP) air interface without terminating the LWA session.

Example 13 includes the apparatus of example 12, wherein the one or more processors and memory are further configured to process a request, received from the UE, to suspend communication of the one or more PDUs on the WLAN belonging to a LWA split bearer.

Example 14 includes the apparatus of example 12 or 13, wherein the one or more processors and memory are further configured to process a request, received from the UE, to resume the communication of the one or more PDUs on the WLAN for the LWA session.

Example 15 includes the apparatus of example 12 or 13, wherein the one or more processors and memory are further configured to process a request, received from the UE, to resume the communication of the one or more PDUs on the WLAN belonging to a LWA split bearer.

Example 16 includes the apparatus of example 13 or 14, wherein the one or more processors and memory are further configured to process a request, using radio resource control (RRC) signaling message received from the UE, to suspend or resume the communication of the one or more PDUs on the WLAN for the LWA session, wherein the RRC signaling is the enhanced WLAN Connection Status Report message.

Example 17 includes the apparatus of example 13 or 14, wherein the one or more processors and memory are further configured to process a request, using in-band signaling received from the UE, to suspend or resume the communication of the one or more PDUs on the WLAN for the LWA session.

Example 18 includes the apparatus of example 13 or 14, wherein the one or more processors and memory are further configured to process a request, using a packet data convergence protocol (PDCP) signal or a media access control (MAC) control element (CE) received from the UE, to suspend or resume the communication of the one or more PDUs on the WLAN for the LWA session.

Example 19 includes the apparatus of example 13, wherein the one or more processors and memory are further configured to process, for transmission to the UE, a suspend confirmation message indicating the LWA session on the WLAN is suspended.

Example 20 includes the apparatus of example 13 or 19, wherein the one or more processors and memory are further configured to process, for transmission to the UE, a suspend rejection message indicating the LWA session on the WLAN is not suspended.

Example 21 includes the apparatus of example 12 or 19, wherein the one or more processors and memory are further configured to suspend communication of the one or more PDUs on the WLAN for the LWA session.

Example 22 includes at least one machine readable storage medium having instructions embodied thereon for performing long-term evolution (LTE) and wireless local area network (WLAN) aggregation (LWA) with a user equipment (UE), the instructions when executed by one or more processors and memory perform the following: determining to suspend communication on a wireless local area network (WLAN) of one or more protocol data units (PDUs) for a LWA session without terminating the LWA session; processing, a request, received from the UE, to suspend communication of the one or more PDUs on the WLAN for the LWA session without terminating the LWA session; suspending communication of the one or more PDUs on the WLAN for the LWA session; scheduling all PDUs for the LWA session for communication through a third generation partnership project (3GPP) air interface without terminating the LWA session; and resuming communication of the one or more PDUs on the WLAN for the LWA session upon receiving a resume communication request from the UE or upon expiration of a selected period of time.

Example 23 includes the at least one machine readable storage medium of example 22, at least one further comprising instructions which when executed by the one or more processors and memory performs the following: processing, a request received from the UE, to suspend communication of the one or more PDUs on the WLAN belonging to a LWA split bearer or a request, received from the UE, to resume the communication of the one or more PDUs on the WLAN belonging to a LWA split bearer.

Example 24 includes the machine readable storage medium of example 22 or 23, at least one further comprising instructions which when executed by the one or more processors and memory performs the following: processing for transmission to the UE, a suspend confirmation message indicating the LWA session is suspended or a suspend rejection message indicating the LWA session is not suspended.

Example 25 includes the machine readable storage medium of example 22 or 24, at least one further comprising instructions which when executed by the one or more processors and memory performs the following: processing a request, using radio resource control (RRC) signaling message received from the UE, to suspend or resume the communication of the one or more PDUs on the WLAN for the LWA session, wherein the RRC signaling is the enhanced WLAN Connection Status Report message; processing, a request using in-band signaling received from the UE, to suspend or resume the communication of the one or more PDUs on the WLAN for the LWA session; or processing a request using a packet data convergence protocol (PDCP) signal or a media access control (MAC) control element (CE) received from the UE, to suspend or resume the communication of the one or more PDUs on the WLAN for the LWA session.

Example 26 includes apparatus of a user equipment (UE), the UE configured to perform long-term evolution (LTE) and wireless local area network (WLAN) aggregation (LWA), the apparatus comprising one or more processors and memory configured to: determine to suspend communication on a wireless local area network (WLAN) of one or more protocol data units (PDUs) for a LWA session without terminating the LWA session; and process, for transmission to an eNodeB, a request to suspend communication of the one or more PDUs on the WLAN to enable the eNodeB to schedule the one or more PDUs for transmission to the UE through a third generation partnership project (3GPP) air interface without terminating the LWA session.

Example 27 includes the apparatus of example 26, wherein the one or more processors and memory are further configured to process, for transmission to the eNodeB, a request to suspend communication of the one or more PDUs on the WLAN belonging to a LWA split bearer.

Example 28 includes the apparatus of example 26, wherein the one or more processors and memory are further configured to process, for transmission to the eNodeB, a request to resume the communication of the one or more PDUs on the WLAN for the LWA session.

Example 29 includes the apparatus of example 26, wherein the one or more processors and memory are further configured to process, for transmission to the eNodeB, a request to resume the communication of the one or more PDUs on the WLAN belonging to a LWA split bearer.

Example 30 includes the apparatus of example 26, wherein the one or more processors and memory are further configured to process, for transmission using radio resource control (RRC) signaling message, a request to the eNB to suspend or resume the communication of the one or more PDUs on the WLAN for the LWA session.

Example 31 includes the apparatus of example 30, wherein the RRC signaling is the enhanced WLAN Connection Status Report message.

Example 32 includes the apparatus of example 26, wherein the one or more processors and memory are further configured to process, for transmission using in-band signaling, a request to the eNB to suspend or resume the communication of the one or more PDUs on the WLAN for the LWA session.

Example 33 includes the apparatus of example 26, wherein the one or more processors and memory are further configured to process, for transmission using a packet data convergence protocol (PDCP) signal or a media access control (MAC) control element (CE), a request to the eNB to suspend or resume the communication of the one or more PDUs on the WLAN for the LWA session.

Example 34 includes the apparatus of example 26, wherein the one or more processors and memory are further configured to process, a suspend confirmation message received, from the eNodeB, indicating that the LWA session on the WLAN is suspended.

Example 35 includes the apparatus of example 26, wherein the one or more processors and memory are further configured to process, a suspend rejection message received, from the eNodeB, indicating the LWA session on the WLAN is not suspended.

Example 36 includes the apparatus of example 26, wherein the apparatus includes at least one of an antenna, a touch sensitive display screen, a speaker, a microphone, a graphics processor, a baseband processor, an application processor, internal memory, a non-volatile memory port, and combinations thereof.

Example 37 includes an apparatus of an eNodeB, the eNodeB configured to perform long-term evolution (LTE) and wireless local area network (WLAN) aggregation (LWA) with a user equipment (UE), the apparatus comprising one or more processors and memory configured to: identify one or more protocol data units (PDUs) to be scheduled for communication over a third generation partnership project (3GPP) air interface and one or more PDUs communicated over a wireless local area network (WLAN) in a LWA session; process a request, received from the UE, to suspend communication of the one or more PDUs on the WLAN for the LWA session without terminating the LWA session; and schedule all PDUs for the LWA session for communication through a third generation partnership project (3GPP) air interface without terminating the LWA session.

Example 38 includes the apparatus of example 37, wherein the one or more processors and memory are further configured to process a request, received from the UE, to suspend communication of the one or more PDUs on the WLAN belonging to a LWA split bearer.

Example 39 includes the apparatus of example 37, wherein the one or more processors and memory are further configured to process a request, received from the UE, to resume the communication of the one or more PDUs on the WLAN for the LWA session.

Example 40 includes the apparatus of example 37, wherein the one or more processors and memory are further configured to process a request, received from the UE, to resume the communication of the one or more PDUs on the WLAN belonging to a LWA split bearer.

Example 41 includes the apparatus of example 37, wherein the one or more processors and memory are further configured to process a request, using radio resource control (RRC) signaling message received from the UE, to suspend or resume the communication of the one or more PDUs on the WLAN for the LWA session, wherein the RRC signaling is the enhanced WLAN Connection Status Report message.

Example 42 includes the apparatus of example 37, wherein the one or more processors and memory are further configured to process a request, using in-band signaling received from the UE, to suspend or resume the communication of the one or more PDUs on the WLAN for the LWA session.

Example 43 includes the apparatus of example 37, wherein the one or more processors and memory are further configured to process a request, using a packet data convergence protocol (PDCP) signal or a media access control (MAC) control element (CE) received from the UE, to suspend or resume the communication of the one or more PDUs on the WLAN for the LWA session.

Example 44 includes the apparatus of example 37, wherein the one or more processors and memory are further configured to process, for transmission to the UE, a suspend confirmation message indicating the LWA session on the WLAN is suspended.

Example 45 includes the apparatus of example 37, wherein the one or more processors and memory are further configured to process, for transmission to the UE, a suspend rejection message indicating the LWA session on the WLAN is not suspended.

Example 46 includes the apparatus of example 37, wherein the one or more processors and memory are further configured to suspend communication of the one or more PDUs on the WLAN for the LWA session.

Example 47 includes a least one transitory or non-transitory machine readable storage medium having instructions embodied thereon for performing long-term evolution (LTE) and wireless local area network (WLAN) aggregation (LWA) with a user equipment (UE), the instructions when executed by one or more processors and memory perform the following: determining: a determining to suspend communication on a wireless local area network (WLAN) of one or more protocol data units (PDUs) for a LWA session without terminating the LWA session; processing, a request, received from the UE, to suspend communication of the one or more PDUs on the WLAN for the LWA session without terminating the LWA session; suspending communication of the one or more PDUs on the WLAN for the LWA session; scheduling all PDUs for the LWA session for communication through a third generation partnership project (3GPP) air interface without terminating the LWA session; and resuming communication of the one or more PDUs on the WLAN for the LWA session upon receiving a resume communication request from the UE or upon expiration of a selected period of time.

Example 48 includes the transitory or non-transitory machine readable storage medium of example 47, at least one further comprising instructions which when executed by the one or more processors and memory performs the following: processing, a request received from the UE, to suspend communication of the one or more PDUs on the WLAN belonging to a LWA split bearer or a request, received from the UE, to resume the communication of the one or more PDUs on the WLAN belonging to a LWA split bearer.

Example 49 includes the transitory or non-transitory machine readable storage medium of example 47 or 48, at least one further comprising instructions which when executed by the one or more processors and memory performs the following: processing for transmission to the UE, a suspend confirmation message indicating the LWA session is suspended or a suspend rejection message indicating the LWA session is not suspended.

Example 50 includes the transitory or non-transitory machine readable storage medium of example 47 or 48, at least one further comprising instructions which when executed by the one or more processors and memory performs the following: processing a request, using radio resource control (RRC) signaling message received from the UE, to suspend or resume the communication of the one or more PDUs on the WLAN for the LWA session, wherein the RRC signaling is the enhanced WLAN Connection Status Report message; processing, a request using in-band signaling received from the UE, to suspend or resume the communication of the one or more PDUs on the WLAN for the LWA session; or processing a request using a packet data convergence protocol (PDCP) signal or a media access control (MAC) control element (CE) received from the UE, to suspend or resume the communication of the one or more PDUs on the WLAN for the LWA session.

Example 51 includes an apparatus of a user equipment (UE), the UE configured to perform long-term evolution (LTE) and wireless local area network (WLAN) aggregation (LWA), the apparatus comprising one or more processors and memory configured to: determine to suspend communication on a wireless local area network (WLAN) of one or more protocol data units (PDUs) for a LWA session without terminating the LWA session; and process, for transmission to an eNodeB, a request to suspend communication of the one or more PDUs on the WLAN to enable the eNodeB to schedule the one or more PDUs for transmission to the UE through a third generation partnership project (3GPP) air interface without terminating the LWA session.

Example 52 includes the apparatus of example 51, wherein the one or more processors and memory are further configured to: process, for transmission to the eNodeB, a request to suspend communication of the one or more PDUs on the WLAN belonging to a LWA split bearer; process, for transmission to the eNodeB, a request to resume the communication of the one or more PDUs on the WLAN for the LWA session; or process, for transmission to the eNodeB, a request to resume the communication of the one or more PDUs on the WLAN belonging to a LWA split bearer.

Example 53 includes the apparatus of example 51 or 52, wherein the one or more processors and memory are further configured to process, for transmission using radio resource control (RRC) signaling message, a request to the eNB to suspend or resume the communication of the one or more PDUs on the WLAN for the LWA session, wherein the RRC signaling is the enhanced WLAN Connection Status Report message.

In Example 54, the subject matter of Example 51 or any of the Examples described herein may further configured to, wherein the one or more processors and memory are further configured to process, for transmission using in-band signaling, a request to the eNB to suspend or resume the communication of the one or more PDUs on the WLAN for the LWA session.

In Example 55, the subject matter of Example 51 or any of the Examples described herein may further configured to, wherein the one or more processors and memory are further configured to process, for transmission using a packet data convergence protocol (PDCP) signal or a media access control (MAC) control element (CE), a request to the eNB to suspend or resume the communication of the one or more PDUs on the WLAN for the LWA session.

In Example 56, the subject matter of Example 51 or any of the Examples described herein may further configured to, wherein the one or more processors and memory are further configured to: process, a suspend confirmation message received, from the eNodeB, indicating that the LWA session on the WLAN is suspended; or process, a suspend rejection message received, from the eNodeB, indicating the LWA session on the WLAN is not suspended.

In Example 57, the subject matter of Example 51 or any of the Examples described herein may further configured to, wherein the apparatus includes at least one of an antenna, a touch sensitive display screen, a speaker, a microphone, a graphics processor, a baseband processor, an application processor, internal memory, a non-volatile memory port, and combinations thereof.

Example 58 includes an apparatus of an eNodeB, the eNodeB configured to perform long-term evolution (LTE) and wireless local area network (WLAN) aggregation (LWA) with a user equipment (UE), the apparatus comprising one or more processors and memory configured to: identify one or more protocol data units (PDUs) to be scheduled for communication over a third generation partnership project (3GPP) air interface and one or more PDUs communicated over a wireless local area network (WLAN) in a LWA session; process a request, received from the UE, to suspend communication of the one or more PDUs on the WLAN for the LWA session without terminating the LWA session; and schedule all PDUs for the LWA session for communication through a third generation partnership project (3GPP) air interface without terminating the LWA session.

Example 59 includes the apparatus of example 58, wherein the one or more processors and memory are further configured to: process a request, received from the UE, to suspend communication of the one or more PDUs on the WLAN belonging to a LWA split bearer; process a request, received from the UE, to resume the communication of the one or more PDUs on the WLAN for the LWA session; process a request, received from the UE, to resume the communication of the one or more PDUs on the WLAN belonging to a LWA split bearer.

Example 60 includes the apparatus of example 58 or 59, wherein the one or more processors and memory are further configured to process a request, using radio resource control (RRC) signaling message received from the UE, to suspend or resume the communication of the one or more PDUs on the WLAN for the LWA session, wherein the RRC signaling is the enhanced WLAN Connection Status Report message.

In Example 61, the subject matter of Example 58 or any of the Examples described herein may further configured to, wherein the one or more processors and memory are further configured to: process a request, using in-band signaling received from the UE, to suspend or resume the communication of the one or more PDUs on the WLAN for the LWA session; or process a request, using a packet data convergence protocol (PDCP) signal or a media access control (MAC) control element (CE) received from the UE, to suspend or resume the communication of the one or more PDUs on the WLAN for the LWA session.

In Example 62, the subject matter of Example 58 or any of the Examples described herein may further configured to, wherein the one or more processors and memory are further configured to; process, for transmission to the UE, a suspend confirmation message indicating the LWA session on the WLAN is suspended; process, for transmission to the UE, a suspend rejection message indicating the LWA session on the WLAN is not suspended; or suspend communication of the one or more PDUs on the WLAN for the LWA session.

Example 63 includes at least one transitory or non-transitory machine readable storage medium having instructions embodied thereon for performing long-term evolution (LTE) and wireless local area network (WLAN) aggregation (LWA) with a user equipment (UE), the instructions when executed by one or more processors and memory perform the following: determining to suspend communication on a wireless local area network (WLAN) of one or more protocol data units (PDUs) for a LWA session without terminating the LWA session; processing, a request, received from the UE, to suspend communication of the one or more PDUs on the WLAN for the LWA session without terminating the LWA session; suspending communication of the one or more PDUs on the WLAN for the LWA session; scheduling all PDUs for the LWA session for communication through a third generation partnership project (3GPP) air interface without terminating the LWA session; and resuming communication of the one or more PDUs on the WLAN for the LWA session upon receiving a resume communication request from the UE or upon expiration of a selected period of time.

Example 64 includes the transitory or non-transitory machine readable storage medium of example 63, at least one further comprising instructions which when executed by the one or more processors and memory performs the following: processing, a request received from the UE, to suspend communication of the one or more PDUs on the WLAN belonging to a LWA split bearer or a request, received from the UE, to resume the communication of the one or more PDUs on the WLAN belonging to a LWA split bearer.

Example 65 includes the transitory or non-transitory machine readable storage medium of example 63 or 64, at least one further comprising instructions which when executed by the one or more processors and memory performs the following: processing for transmission to the UE, a suspend confirmation message indicating the LWA session is suspended or a suspend rejection message indicating the LWA session is not suspended; processing a request, using radio resource control (RRC) signaling message received from the UE, to suspend or resume the communication of the one or more PDUs on the WLAN for the LWA session, wherein the RRC signaling is the enhanced WLAN Connection Status Report message; processing, a request using in-band signaling received from the UE, to suspend or resume the communication of the one or more PDUs on the WLAN for the LWA session; or processing a request using a packet data convergence protocol (PDCP) signal or a media access control (MAC) control element (CE) received from the UE, to suspend or resume the communication of the one or more PDUs on the WLAN for the LWA session.

Example 66 includes a device for performing long-term evolution (LTE) and wireless local area network (WLAN) aggregation (LWA) with a user equipment (UE), the device comprising: means for determining to suspend communication on a wireless local area network (WLAN) of one or more protocol data units (PDUs) for a LWA session without terminating the LWA session; means for processing, a request, received from the UE, to suspend communication of the one or more PDUs on the WLAN for the LWA session without terminating the LWA session; means for suspending communication of the one or more PDUs on the WLAN for the LWA session; means for scheduling all PDUs for the LWA session for communication through a third generation partnership project (3GPP) air interface without terminating the LWA session; and means for resuming communication of the one or more PDUs on the WLAN for the LWA session upon receiving a resume communication request from the UE or upon expiration of a selected period of time.

Example 67 includes the device of example 66, further comprising means for processing, a request received from the UE, to suspend communication of the one or more PDUs on the WLAN belonging to a LWA split bearer or a request, received from the UE, to resume the communication of the one or more PDUs on the WLAN belonging to a LWA split bearer.

Example 68 includes the device of example 66 or 67, further comprising means for processing for transmission to the UE, a suspend confirmation message indicating the LWA session is suspended or a suspend rejection message indicating the LWA session is not suspended.

Example 69 includes the device of example 66 or 67, further comprising: means for processing a request, using radio resource control (RRC) signaling message received from the UE, to suspend or resume the communication of the one or more PDUs on the WLAN for the LWA session, wherein the RRC signaling is the enhanced WLAN Connection Status Report message; means for processing, a request using in-band signaling received from the UE, to suspend or resume the communication of the one or more PDUs on the WLAN for the LWA session; or means for processing a request using a packet data convergence protocol (PDCP) signal or a media access control (MAC) control element (CE) received from the UE, to suspend or resume the communication of the one or more PDUs on the WLAN for the LWA session.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, transitory or non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE), the UE configured to perform long-term evolution (LTE) and wireless local area network (WLAN) aggregation (LWA), the apparatus comprising one or more processors and memory configured to:
    determine to suspend communication on a wireless local area network (WLAN) of one or more protocol data units (PDUs) for a LWA session without terminating the LWA session;
    process, for transmission to an eNodeB, a request to suspend communication of the one or more PDUs on the WLAN to enable the eNodeB to schedule the one or more PDUs for transmission to the UE through a cellular interface without terminating the LWA session; and
    process, for transmission using radio resource control (RRC) signaling, a request to the eNB to suspend or resume the communication of the one or more PDUs on the WLAN for the LWA session, and wherein the RRC signaling is an enhanced WLAN Connection Status Report message.

2. The apparatus of claim 1, wherein the one or more processors and memory are further configured to process, for transmission to the eNodeB, a request to suspend communication of the one or more PDUs on the WLAN belonging to a LWA split bearer.

3. The apparatus of claim 1, wherein the one or more processors and memory are further configured to process, for transmission to the eNodeB, a request to resume the communication of the one or more PDUs on the WLAN for the LWA session.

4. The apparatus of claim 1, wherein the one or more processors and memory are further configured to process, for transmission to the eNodeB, a request to resume the communication of the one or more PDUs on the WLAN belonging to a LWA split bearer.

5. The apparatus of claim 1, wherein the one or more processors and memory are further configured to process, for transmission using in-band signaling, a request to the eNB to suspend or resume the communication of the one or more PDUs on the WLAN for the LWA session.

6. The apparatus of claim 1, wherein the one or more processors and memory are further configured to process, for transmission using a packet data convergence protocol (PDCP) signal or a media access control (MAC) control element (CE), a request to the eNB to suspend or resume the communication of the one or more PDUs on the WLAN for the LWA session.

7. The apparatus of claim 1, wherein the one or more processors and memory are further configured to process, a suspend confirmation message received, from the eNodeB, indicating that the LWA session on the WLAN is suspended.

8. The apparatus of claim 1, wherein the one or more processors and memory are further configured to process, a suspend rejection messaged received, from the eNodeB, indicating the LWA session on the WLAN is not suspended.

9. The apparatus of claim 1, wherein the apparatus includes at least one of an antenna, a touch sensitive display screen, a speaker, a microphone, a graphics processor, a baseband processor, an application processor, internal memory, a non-volatile memory port, and combinations thereof.

10. An apparatus of an eNodeB, the eNodeB configured to perform long-term evolution (LTE) and wireless local area network (WLAN) aggregation (LWA) with a user equipment (UE), the apparatus comprising one or more processors and memory configured to:
    Identify one or more protocol data units (PDUs) to be scheduled for communication over a cellular interface and one or more PDUs communicated over a wireless local area network (WLAN) in a LWA session;
    process a request, received from the UE, to suspend communication of the one or more PDUs on the WLAN for the LWA session without terminating the LWA session;
    schedule all PDUs for the LWA session for communication through a cellular interface without terminating the LWA session; and
    process a request, using radio resource control (RRC) signaling received from the UE, to suspend or resume the communication of the one or more PDUs on the WLAN for the LWA session, wherein the RRC signaling is the enhanced WLAN Connection Status Report message.

11. The apparatus of claim 10, wherein the one or more processors and memory are further configured to process a request, received from the UE, to suspend communication of the one or more PDUs on the WLAN belonging to a LWA split bearer.

12. The apparatus of claim 10, wherein the one or more processors and memory are further configured to process a request, received from the UE, to resume the communication of the one or more PDUs on the WLAN for the LWA session.

13. The apparatus of claim 10, wherein the one or more processors and memory are further configured to process a request, received from the UE, to resume the communication of the one or more PDUs on the WLAN belonging to a LWA split bearer.

14. The apparatus of claim 10, wherein the one or more processors and memory are further configured to process a request, using in-band signaling received from the UE, to suspend or resume the communication of the one or more PDUs on the WLAN for the LWA session.

15. The apparatus of claim 10, wherein the one or more processors and memory are further configured to process a request, using a packet data convergence protocol (PDCP) signal or a media access control (MAC) control element (CE) received from the UE, to suspend or resume the communication of the one or more PDUs on the WLAN for the LWA session.

16. The apparatus of claim 10, wherein the one or more processors and memory are further configured to process, for transmission to the UE, a suspend confirmation messaged indicating the LWA session on the WLAN is suspended.

17. The apparatus of claim 10, wherein the one or more processors and memory are further configured to process, for transmission to the UE, a suspend rejection message indicating the LWA session on the WLAN is not suspended.

18. The apparatus of claim 10, wherein the one or more processors and memory are further configured to suspend communication of the one or more PDUs on the WLAN for the LWA session.

19. A least one non-transitory machine readable storage medium having instructions embodied thereon for performing long-term evolution (LTE) and wireless local area network (WLAN) aggregation (LWA) with a user equipment (UE), the instructions when executed by one or more processors and memory perform the following:
  determining to suspend communication on a wireless local area network (WLAN) of one or more protocol data units (PDUs) for a LWA session without terminating the LWA session;
  processing, a request, received from the UE, to suspend communication of the one or more PDUs on the WLAN for the LWA session without terminating the LWA session;
  suspending communication of the one or more PDUs on the WLAN for the LWA session;
  scheduling all PDUs for the LWA session for communication through a cellular interface without terminating the LWA session;
  resuming communication of the one or more PDUs on the WLAN for the LWA session upon receiving a resume communication request from the UE or upon expiration of a selected period of time; and
  processing a request, using radio resource control (RRC) signaling received from the UE, to suspend or resume the communication of the one or more PDUs on the WLAN for the LWA session, wherein the RRC signaling is the enhanced WLAN Connection Status Report message.

20. The non-transitory machine readable storage medium of claim 19, at least one further comprising instructions which when executed by the one or more processors and memory performs the following: processing, a request received from the UE, to suspend communication of the one or more PDUs on the WLAN belonging to a LWA split bearer or a request, received from the UE, to resume the communication of the one or more PDUs on the WLAN belonging to a LWA split bearer.

21. The non-transitory machine readable storage medium of claim 19, at least one further comprising instructions which when executed by the one or more processors and memory performs the following: processing for transmission to the UE, a suspend confirmation messaged indicating the LWA session is suspended or a suspend rejection message indicating the LWA session is not suspended.

22. The non-transitory machine readable storage medium of claim 19, at least one further comprising instructions which when executed by the one or more processors and memory performs the following:
  processing, a request using in-band signaling received from the UE, to suspend or resume the communication of the one or more PDUs on the WLAN for the LWA session; or
  processing a request using a packet data convergence protocol (PDCP) signal or a media access control (MAC) control element (CE) received from the UE, to suspend or resume the communication of the one or more PDUs on the WLAN for the LWA session.

* * * * *